May 16, 1944.   P. BOLLEE ET AL   2,348,782
MEANS FOR TESTING HARDNESS OF MATERIALS
Filed Feb. 14, 1940   3 Sheets-Sheet 1
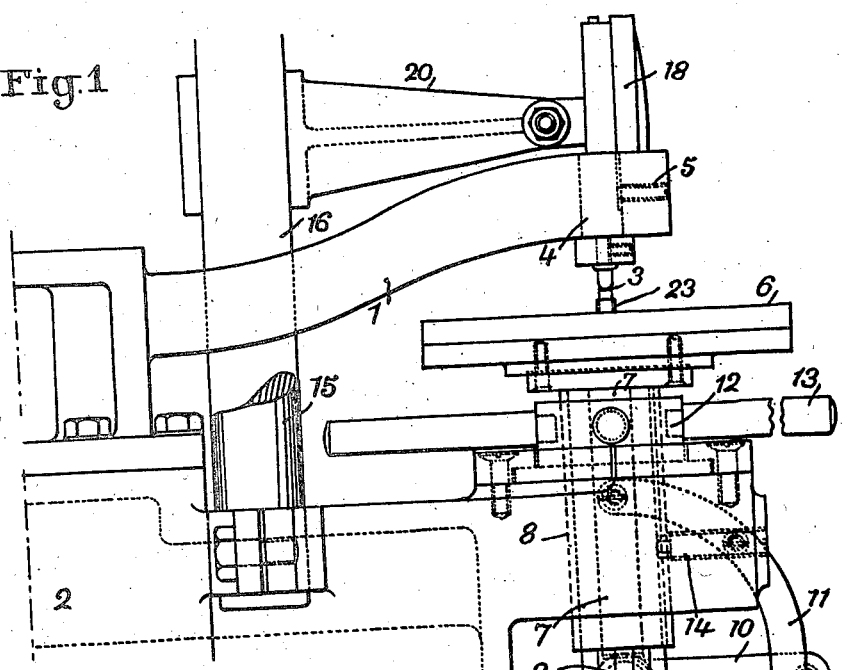
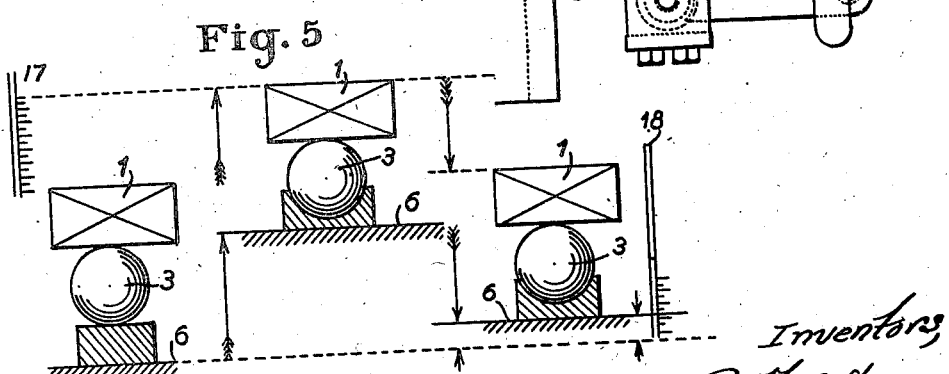

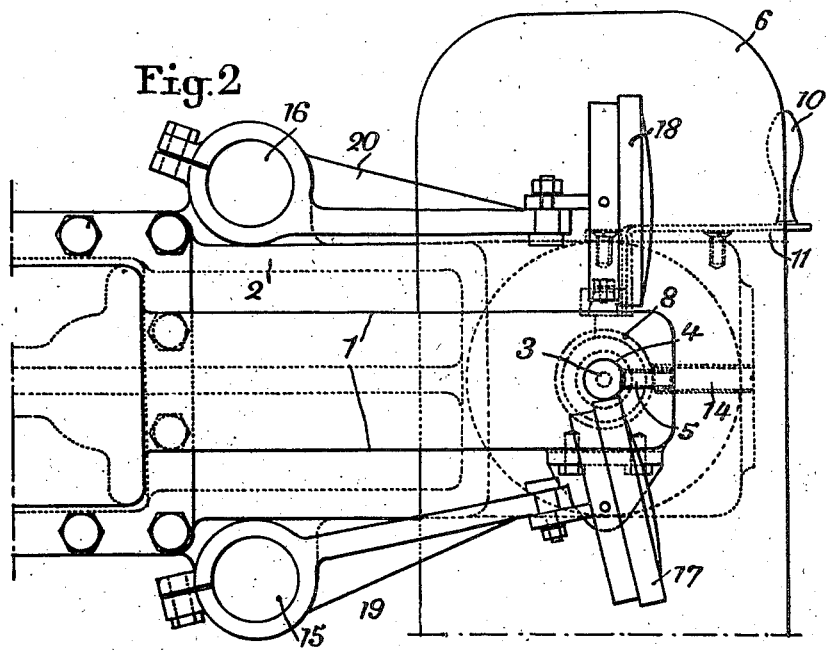
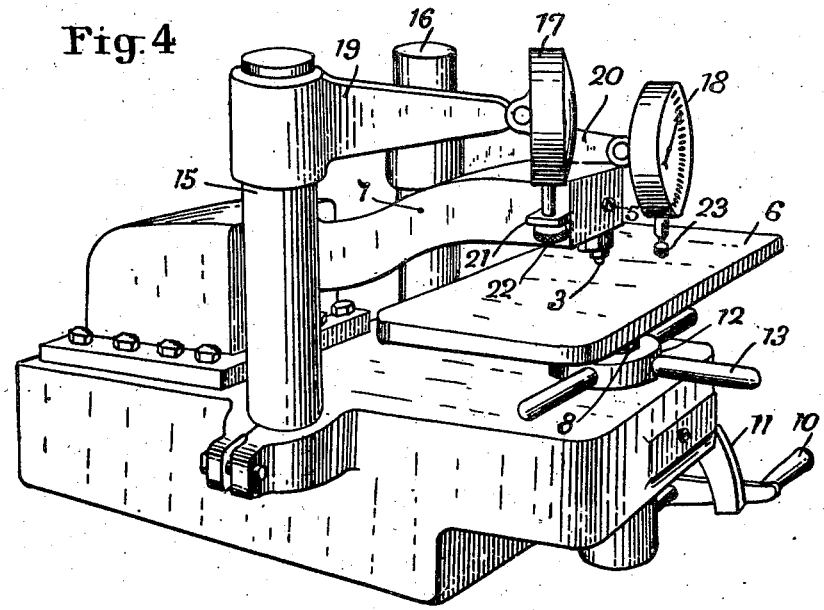

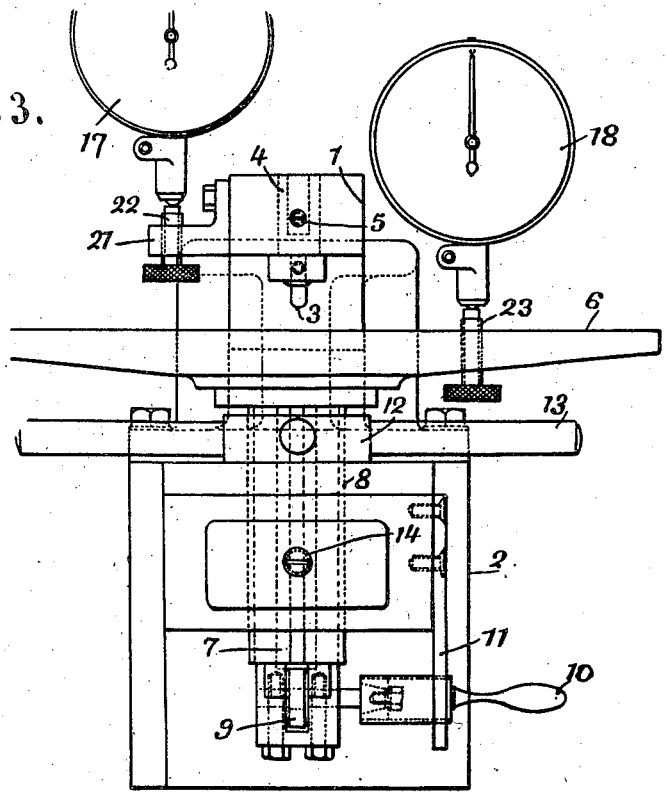

Patented May 16, 1944

2,348,782

UNITED STATES PATENT OFFICE 2,348,782

MEANS FOR TESTING HARDNESS OF MATERIALS

Pièrre Bollée and Marcel Bollée, Le Mans, France; vested in the Alien Property Custodian Application February 14, 1940, Serial No. 318,932
In France October 20, 1939

1 Claim.  (Cl. 265—12)

This invention relates to means for testing hardness of materials.

It is well-known that the hardness of materials may be determined by measuring the impression effected on a convenient sample of the substance to be tested by an impression producing element, such as steel ball, diamond sphere, diamond cone, square point of diamond or any other suitable substance, the measurement of impression being effected by measuring either the depth or the diameter of said impression when said impression producing element is constituted by a sphere. With some known machines the hardness is determined by the load which must be exerted on the impression producing element for indenting the material to be tested to a determined depth of impression.

The load exerted on the impression producing element is constituted either by a system of weights and levers by a liquid pressure (produced by a pump); by a spring constituting a dynamometer or by the combination of several of the cited means.

The mechanism which produces and transmits the pressure to the impression producing element (ball or other) requires a complicated delicate and expensive arrangement, which contributes in a large part to the cost of maintenance and to the lack of precision of the machine.

The means according to this invention which remedies the above deficiencies comprises in combination a table designed for receiving the pieces or samples of material to be tested, provided with a hand operating device for displacing same and for resiliently forcing the piece or sample to be tested against the impression producing element which is located on a convenient support, comparators in any number located on convenient supports being provided with contacting plungers or fingers respectively in contact with the table and with the arm of the impression producing element.

In the accompanying drawings which show by way of example a preferred embodiment of a testing machine according to this invention, Fig. 1 shows a side view, Fig. 2 shows a plan view, Fig. 3 shows an end view, Fig. 4 shows a perspective view of the machine, Fig. 5 is a diagram showing the principle of operation of the machine, The member which carries the impression producing element (ball or other) is an arm 1 having a suitable cross section, a suitable length and made of suitable material, said member being rigidly mounted on the frame 2 of the machine. The impression producing element 3 is shown on the drawing as a ball of $\frac{1}{16}$ of inch and is secured at the end of arm 1 by means of the socket 4 and set screw 5.

The sample of material to be tested is upon the table 6 which is provided with a depending central shaft 7 for instance cylindrical in shape which passes axially through the hollow jack screw 8. When no test is being conducted, the table 6 rests upon the upper end of screw 8 while its central shaft 7 which constitutes a lifting medium is in contact with a cam 9 provided with an actuating hand lever 10 combined with a braking device constituted by a friction sector 11 secured on the frame 2 of the machine. The cam 9 is mounted on the lower end of screw 8. A nut 12 provided with radial arms 13 is arranged for raising or lowering the screw 8 which is allowed only to slide endwise, a screw 14 or key holding it against rotation.

This arrangement enables the vertical displacement of table 6 to be controlled either by the hand nut 12 for the quick displacements, or by means of the cam 9 and lever 10 for slow displacements.

The vertical columns 15 and 16 (note Figs. 2 and 4), rigidly secured on frame 2, are provided for securing the dial comparators 17 and 18 by means of arms 19 and 20. The contact plungers of the comparators are located in the vertical transverse plane of the machine which passes through the impact point of the impression producing element upon the material to be tested. The fixed point of said comparators being the frame 2 of the machine, said plungers of comparator 17 are in contact, with arm 1 through the angle bar 21 with a micrometric regulating screw 22, and of comparator 18, with the table 6 supporting the material to be tested, by means of the micrometric regulating screw 23.

The result of such an arrangement is that the extent of yielding of the arm 1 is measured by means of the comparator 17, while the comparator 18 measures the extent of raising of the table.

The operation is as follows:

The sample of material to be tested is first placed upon the table 6. By operating the hand wheel 12, the operator actuates the screw jack 8 until the pointer of the comparator 17 begins to move, the comparator 18 being already in contact with the plate 6 through adjustment effected by means of the regulating screw 23.

When the said pointer of comparator 17 starts moving, the operator brings both dials of comparators to zero. He then swings the cam lever 10 for actuating the central lifting member 7 of the table thus exerting a thrust of the sample to be tested against the ball 3, which transmits such thrust to the end of arm 1 and deflects said arm until said deflection, measured by the comparator 17, indicates that the required pressure for testing the hardness has been transmitted to the ball 3.

The pointer of comparator 17 having attained a mark of the dial relating to the load deflection, the operator, by actuating the lever 10, depresses said lever and lowers the table 6. Said table is stopped when the pointer of comparator 17 attains its starting zero point, that is to say, when the pressure or thrust on the ball has returned to zero. The pointer of comparator 18 indicates a quantity which is equal to the depth of the impression on the sample to be tested.

Fig. 5 diagrammatically shows in positions I, II and III, the respective positions of the table 6, of sample to be tested, of the arm 1, of the ball 3 and of both comparators 17 and 18, while the above mentioned test operations are being performed. In position I, shown at the left in Fig. 5, the positions of these several elements are those assumed when the arbitrary zeroizing positions for a particular sample to be tested has been reached. The indicators on both comparators 17 and 18 now are set at zero. In position II, shown in the center of Fig. 5, the positions of these several elements are those assumed when the desired pressure has been applied through the cam lever 10. The arm 1 has been deflected upwardly through the force applied by cam lever 10 to elevate table 6 transmitted through the contacting ball 3 and sample being tested on the table. Ball 3 is thus caused to indent the sample. Comparator 17 now indicates the load deflection. In position III shown at the right in Fig. 5, the positions of these elements are those assumed when table 6 is again lowered until comparator 17 again indicates zero on its dial. It will be noted that the faces of arm 1 are in the same horizontal planes in positions I and III, but in position III the top of the table 6 is above the level it formerly had (in position I) by the depth of the indentation of ball 3 into the sample being tested. This depth of indentation is directly indicated on comparator 18.

It is important that arm 1 be not deflected beyond its elastic limit, and various time-saving devices may be utilized to facilitate return of arm 1 to its initial position after deflection.

It will be understood that the embodiment herein disclosed is merely for purposes of exemplification and various modifications and substitutions are possible within the spirit and scope of the subjoined claim.

What we claim is:

A machine for testing the hardness of materials comprising a frame, a table supported for vertical movements on said frame and adapted to carry the materials to be tested, an arm formed of material possessing a limited degree of resiliency rigidly secured to the frame at one extremity and extending above the table, an impression producing element mounted in said arm adjacent its free extremity in position to engage materials to be tested carried by the table, a control device carried by the frame for quickly moving the table vertically to arbitrary preloading positions coincident to zero readings in tests, a second control device mounted on the frame for slowly elevating the table by applying pressure thereto during tests, a plurality of supports rigidly mounted on the frame adjacent said table and arm, and a comparator carried by each of said supports with its plunger located in the same vertical transverse plane as said impression producing element, one of said comparators having its plunger in contact with said table and another of said comparators having its plunger in contact with said arm during tests.

PIERRE BOLLÉE.
MARCEL BOLLÉE.